United States Patent
Pappalardo

[19]

[11] Patent Number: 5,838,101
[45] Date of Patent: Nov. 17, 1998

[54] FLUORESCENT LAMP WITH IMPROVED CRI AND BRIGHTNESS

[75] Inventor: Romano G. Pappalardo, Sudbury, Mass.

[73] Assignee: GTE Products Corporation, Danvers, Mass.

[21] Appl. No.: 967,607

[22] Filed: Oct. 28, 1992

[51] Int. Cl.⁶ ........................................ H01J 1/62
[52] U.S. Cl. .................. 313/487; 313/485; 313/486
[58] Field of Search ........................ 313/487, 484, 313/486; 252/309.36, 700, 301.4 R, 301.4 F; 345/47

[56] References Cited

U.S. PATENT DOCUMENTS

| | | | |
|---|---|---|---|
| 3,858,082 | 12/1974 | Thornton, Jr. | 313/487 |
| 3,875,453 | 4/1975 | Thornton, Jr. | 313/487 |
| 3,937,998 | 2/1976 | Verstegen et al. | 313/487 |
| 4,034,257 | 7/1977 | Hoffman | 313/487 |
| 4,038,204 | 7/1977 | Wachtel | 252/301.4 P |
| 4,055,781 | 10/1977 | Schreurs et al. | 313/487 |
| 4,231,892 | 11/1980 | Chang et al. | 252/301.6 |
| 4,251,750 | 2/1981 | Galien et al. | 313/487 |
| 4,266,161 | 5/1981 | Kasenga | 313/487 |
| 4,296,353 | 10/1981 | Walter | 313/487 |
| 4,305,019 | 12/1981 | Gragg et al. | 313/487 |
| 4,423,349 | 12/1983 | Nakajima et al. | 313/487 |
| 4,551,397 | 11/1985 | Yaguchi et al. | 428/691 |
| 4,602,188 | 7/1986 | de Hair et al. | 313/487 |
| 4,623,816 | 11/1986 | Hoffman et al. | 313/487 |
| 4,717,857 | 1/1988 | Wozniak et al. | 313/487 |
| 4,728,459 | 3/1988 | Fan | 252/301.5 |
| 4,797,594 | 1/1989 | Sigai et al. | 313/488 |
| 4,806,824 | 2/1989 | Paynter et al. | 313/486 |
| 4,897,217 | 1/1990 | Jackson et al. | 252/301.4 P |
| 5,049,779 | 9/1991 | Itsuki et al. | 313/486 |
| 5,051,277 | 9/1991 | Sigai et al. | 427/69 |
| 5,087,523 | 2/1992 | Klinedinst et al. | 427/69 |
| 5,105,122 | 4/1992 | Konings et al. | 313/487 |
| 5,122,710 | 6/1992 | Northrop | 313/487 |
| 5,196,234 | 3/1993 | Taubner et al. | 313/213 |
| 5,232,626 | 8/1993 | McSweeney | 252/301.4 |

FOREIGN PATENT DOCUMENTS

| | | |
|---|---|---|
| 60-14743 | 1/1985 | Japan . |
| 62-02444 | 5/1987 | Japan . |

*Primary Examiner*—Amare Mengistu
*Attorney, Agent, or Firm*—Carlo S. Bessone

[57] ABSTRACT

A fluorescent lamp has a coating on the interior surface of the glass envelope comprising an alkaline earth metal halophosphate phosphor and a quad-phosphor blend wherein the combination of phosphors result in a predetermined color point from about 2700 to about 4200 K on or near the Planckian locus where the alkaline earth metal halophosphate phosphor comprises a blend of halophosphate phosphors having a color temperature substantially matching the color temperature of the quad-blend which includes an europium activated aluminate as a phosphor component.

20 Claims, 14 Drawing Sheets

FLUORESCENT LAMP WITH IMPROVED CRI AND BRIGHTNESS

TECHNICAL FIELD OF THE INVENTION

This invention relates to fluorescent lamps and fluorescent lamp phosphors.

BACKGROUND OF THE INVENTION

Desirable fluorescent lamp characteristics are high brightness and high color rendering at an economical cost. To achieve this goal, such lamps as the Octron and Designer series of lamps are constructed with two layers of phosphor coatings. The first or the base coat is an inexpensive halophosphate phosphor of the desired lamp color temperature. The second or skin coat is comprised of three expensive rare earth activated phosphors, emitting in the red, green and blue spectral regions, blended to effect a composite white emission of desired color temperature. In this configuration the expensive tri-phosphor blend absorbs the ultra-violet excitation energy of the Hg plasma in excess proportion to the weight of the phosphor in the lamps. The halophosphate base coat absorbs the excitation energy that eludes the skin coat, while diluting the high CRI and brightness capability of the tri-phosphor blend. Even though these phosphor blends achieve desirable economic and performance characteristics, further improvements are desirable.

U.S. Pat. No. 4,623,816 to Hoffman et al relates to a fluorescent lamp utilizing a dual phosphor layer coating having a conventional calcium haloapatite phosphor and a top phosphor layer comprising a tri-phosphor blend including a lanthanum cerium orthophosphate phosphor activated with terbium ion as the green color component along with an europium-activated yttrium oxide phosphor as the red color component.

A skin coat or tri-phosphor blend that has been used is a red $Y_2O_3:Eu^{+3}$ (Sylvania Type 2342), a green $CeMgAl_{11}O_{19}:Tb^{+3}$ (Sylvania Type 2297), and a blue $BaMg_2Al_{16}O_{27}:Eu^{+2}$. Fluorescent lamps utilizing the above skin coat have achieved high color rendering and high brightness while demonstrating excellent durability in the harsh environment of the fluorescent lamp. However, additional and further improvements are desirable. Especially desirable is the production of a blend which produces efficient white color emission and improved color rendition at an even more economical cost.

U.S. Pat. No. 4,716,337 to Huiskes et al describes a fluorescent lamp having a color temperature from 2300 to 3300K. The lamp includes a alkaline earth metal halophosphate activated by $Sb^{+3}$ and $Mn^{+2}$ with a color temperature of 2900–5000K. Specific additional phosphors are set forth as luminescent material activated by bivalent europium, a rare earth metal metaborate activated by trivalent cerium and by bivalent manganese, a trivalent cerium activated garnet crystal, and a green luminescent activated by bivalent manganese. When the alkaline earth metal halophosphate is applied as a separate layer adjacent the glass envelope, it includes a luminescent aluminate activated by trivalent cerium.

The luminous efficacy, color rendering index and other lamp output characteristics may be varied depending upon the particular composition of the lamp phosphors utilized. Certain terms as used in this specification have meanings which are generally accepted in the lighting industry. These terms are described in the IES LIGHTING HANDBOOK, Reference Volume, 1984, Illuminating Engineering Society of North America. The color rendering index of light source (CRI) is a measure of the degree of color shift objects undergo when illuminated by the light source as compared with the color of those same objects when illuminated by a reference source of comparable color temperature. The CRI rating consists of a General Index, $R_a$, based on a set of eight test-color samples that have been found adequate to cover the color gamut. The color appearance of a lamp is described by its chromaticity coordinates which can be calculated from the spectral power distribution according to standard methods. See CIE, *Method of measuring and specifying color rendering properties of light sources* (2nd ed.), Publ. CIE No. 13.2 (TC-3,2), Bureau Central de la CIE, Paris, 1974. The CIE standard chromaticity diagram includes the color points of black body radiators at various temperatures. The locus of blackbody chromaticities on the x,y-diagram is known as the Planckian locus. Any emitting source represented by a point on this locus may be specified by a color temperature. A point near but not on this Planckian locus has a correlated color temperature (CCT) because lines can be drawn from such points to intersect the Planckian locus at this color temperature such that all points look to the average human eye as having nearly the same color. Luminous efficacy of a source of light is the quotient of the total luminous flux emitted by the total lamp power input as expressed in lumens per watt (LPW or 1 m/W).

The present invention addresses the problem of how to economically elevate color rendering while retaining high light flux.

BRIEF SUMMARY OF THE INVENTION

In accordance with the present invention, there is provided a fluorescent lamp comprising a glass envelope having electrodes at its ends, a mercury and inert gas filling within the envelope which produces ultraviolet radiation and a coating on the interior surface of the glass envelope comprising an alkaline earth metal halophosphate phosphor and a quad-phosphor blend for converting a substantial portion of said ultraviolet radiation to visible illumination having a white color wherein the combination of phosphors result in a predetermined color point from about 2700 to about 4200K on or near the Planckian locus. The quad-phosphor blend comprising a red color emitting phosphor component having a visible emission spectrum principally in the 590 to 630 nm wavelength range, blue color emitting phosphor component having an emission spectrum principally in the 430 to 490 nm wavelength range, and a green color emitting phosphor component having an emission spectrum principally in the 500 to 570 nm wavelength range. The quad-phosphor blend additionally includes an europium activate aluminate green emitting phosphor component wherein the quad-blend substantially matches the desired predetermined color point. The alkaline earth metal halophosphate phosphor comprises a blend of halophosphate phosphors having a color temperature also substantially matching the color temperature of the quad-blend. The quad blend and halophosphate phosphor may be applied as a mixture or as separate layers with the halophosphate being directly adjacent the glass envelope.

DETAILED DESCRIPTION

Figure 1:
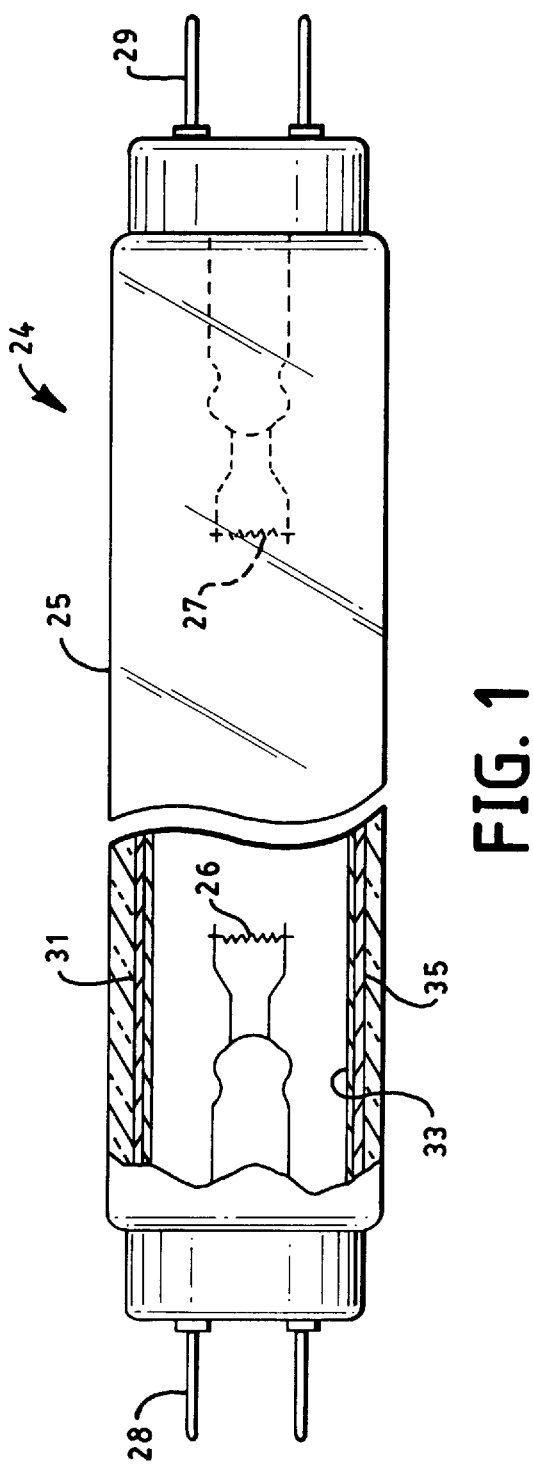
FIG. 1 is perspective view partially broken away of a low pressure mercury discharge fluorescent lamp construction utilizing a dual layer phosphor coating.

Referring to FIG. 1, there is shown a fluorescent lamp 24 containing a phosphor excitable to fluorescence. The lamp 24 comprises a tubular, hermetically sealed, glass envelope 25. Electrodes 26 and 27 are sealed in the ends of envelope 25. Suitable terminals 28 and 29 are connected to the electrodes 26 and 27 and project from envelope 25. The electrodes 26 and 27 extend through glass presses in mount stems to the terminals 28 and 29.

The interior of the tube is filled with an inert gas such as argon or a mixture of argon and krypton at a low pressure, for example 2 torr, and a small quantity of mercury, at least enough to provide a low vapor pressure during operation. An arc generating and sustaining medium such as one or more inert gases and mercury is included within envelope 25 so that ultraviolet radiation is produced in the interior of the glass envelope during lamp operation. A phosphor coating 31 on the interior surface of the glass envelope converts the emitted ultraviolet radiation to visible illumination having a white color.

In accordance with the principles of the present invention, an improved phosphor layers of the present invention which is illustrated at 33 comprises a quad blend of four phosphors of which two are either red or green color emitting phosphors. Although dual phosphor layers are shown in FIG. 1, the quad blend may be utilized as a single coat as a mixture with the halophosphor.

In FIG. 1, the dual layer comprises a first layer 35 deposited on the inner glass surface and a second phosphor layer or top layer 33 deposited on the first phosphor layer 35. The use of a dual phosphor layer permits the weight of phosphor utilized in the second or top coat to be reduced and a less expensive phosphor to be utilized as the first layer 35. The first layer 35 preferably comprises a finely divided fluorescent calcium haloapatite phosphor exhibiting the desired white color point. The second layer or top layer 33 comprises a quad phosphor blend on the inside of the tube so that a substantial portion of the ultraviolet radiation is instantly converted to visible illumination having a white color. The relative proportions of the components in the blend are such that an enhanced color rendering index is produced as compared to a tri-component blends formed from a three phosphor component blend consisting of a single green component. The amount of the quad-phosphor blend applied is generally between about 10 percent and 50 percent of the total combined phosphor weight of the total of the quad-blend and the halophosphor.

Preferred fluorescent lamps of the present invention have a predetermined color temperature from about 2700 to about 4200K and a resulting color point on or near the Planckian locus and preferably enhanced CRI values. One preferred lamp has a color temperature of about 3,000K with a CRI greater than about 80 and a brightness level at 100 hours of about 2500 lumens in a 36 Watt-T12 lamp or about 2780 lumens in a 40 Watt-T12 lamp. In another preferred lamp, at about 4,000 K with a CRI of about 90, the lumen requirements are similar. At one preferred color temperature of about 3950K, the color point is x=0.387 and y=0.391. A preferred correlated color temperature is preferably from about 2750 to about 2850K, more preferably from about 2800K to about 2900K. The most preferred and target correlated color temperature is 2850K. One desirable blend corresponds to a Warm White and sometimes more particularly called a Royal White on the Colorimetric Standard of FIG. 2. The target color point of predetermined x and y values is x=0.4487 and y=0.4091. A preferred range of ICI coordinates is such that the x value is in the range of 0.425 to 0.45, and y value is in the range of 0.375 to 0.425.

In accordance with the present invention, the quad-blend and the halophosphor have substantially matching color temperatures which correspond to the desired color temperature of the lamp. To achieve a matching color point, the halophosphor is preferably a blend of halophosphors. The quad-blend and the halophosphor blend are characterized by similar tristimulus values but with different spectral power distribution to enhance the color rendering of the individual blends.

The relative proportions of the components of the quad-phosphor blend and halophosphor blend light generating medium are such that when their emissions are blended, there is produced visible light having the desirable ICI coordinates. Additionally, the relative proportions of the quad-blend and the halophosphor blend components are such that an enhanced color rendering index is produced as compared to a tri-component blend formed from a three phosphor component blend including only one of the green components.

The halophosphor is a halogenated alkaline earth phosphate with the activator element being lead, manganese, antimony or tin or a blend of such phosphors. The host has the apatite structure, a typical example being calcium chlorophosphate $3Ca_3(PO_4)_2 \cdot CaCl_2$. Many modifications are possible including partial substitutions of the alkaline earth cations by other divalent metals such as zinc and cadmium. Also, partial substitutions of the chloride by fluoride ions is desirable for some applications.

Phosphor materials which result from these combinations generally exhibit good luminescence when stimulated by short (253.7 nanometers) ultraviolet radiation, the response being greatest when the materials are synthesized to produce small deviations from stoichiometry. In particular, activation by combinations of antimony and manganese will produce a wide spectrum of luminescent emissions from alkaline earth phosphates excited by ultraviolet light. Thus, these phosphors have wide application fluorescent lamps and may be adjusted in composition to provide white light which varies from "cool" to "warm" white. Typical phosphors are "Warm White". Sylvania™ Type 4300 and "Cool White", Sylvania™ Type 4450. In the present invention, the preferred phosphors provide a light in the "Warm White" region, more particularly a "Royal White". Although the above calcium chlorophosphate phosphors are economical, improvements to color rendering and efficacy are desirable.

In the preparation of the quad-blend which has a desired predetermined color point, the preferred red color emitting phosphor is a rare earth activated phosphor, preferably europium in the plus three valence state. Typical red emitting phosphors are activated by trivalent europium. Preferred red emitting phosphors are europium activated yttrium vanadium oxide ($YVO_4:Eu^{+3}$), europium activated gadolinium oxide ($Gd_2O_3:E^{+3}$), and europium activated yttrium oxide ($Y_2O_3:E^{+3}$). A most preferred red emitting phosphor is the yttrium oxide activated by trivalent europium having a peak emission at 611 nm and available as Sylvania™ Type 2342 or Type 2345.

Generally, for economic reasons, when a single green phosphor is utilized the preferred alkaline earth metal activated green emitting phosphors are non-rare earth activated. The alkaline earth metal manganese is a preferred activator. Magnesium gallate and magnesium aluminate activated with manganese have the respective formula $MgGa_2O_4:Mn$ and $MgAl_2O_4:Mn$ and the Mn-acitvated zinc orthosilicate phosphor has the basic formula $Zn_2SiO_4:Mn$. As used herein, "green-emitting zinc orthosilicate phosphor" includes any phosphor having a zinc orthosilicate matrix which is activated by at least manganese (II) ions, and which emits light having a peak wavelength of approximately 520–540 nm under 253.7 nanometer excitation. For example, "green-emitting zinc orthosilicate phosphor" is intended to include zinc orthosilicate phosphors having a matrix which may be stoichiometric or non-stoichiometric with respect to zinc, silicon, or oxygen, as well as those which may have lattice defects. "Green-emitting zinc orthosilicate phosphor" is further intended to include such phosphor in which the zinc cation has been partially replaced by other cations. See, for example, U.S. Pat. No. 4,231,892 to Chang et al. or U.S. Pat. No. 4,551,397 to Yaguchi et al. Also intended to be included within the scope of "green-emitting zinc orthosilicate phosphors" as used herein is such phosphor which has one or more activators in addition to manganese (II). U.S. Pat. No. 4,728,459 to Fan describes a manganese-activated zinc silicate phosphor containing a small amount of tungsten to improve maintenance which may be utilized in the present invention.

The preferred green-emitting zinc orthosilicate phosphor has a continuous aluminum oxide coating surrounding individual phosphor particle. Continuous refers to the non-particulate nature of the coating on each coated particle while conformal refers to the coating replication of the submicron surface features found naturally occurring on the uncoated phosphor particles. Such a coated phosphor is made by the techniques described in U.S. Pat. No. 4,825,124 to Sigai. As set forth therein, the continuous aluminum oxide coating is deposited by chemical vapor deposition in a fluidized bed, e.g., an aluminum containing precursor material is deposited on the outer surface of phosphor powder particles while the particles are suspended in an inert gas stream and the aluminum-containing precursor material is reacted to form aluminum oxide. Examples of suitable precursors of the aluminum-containing compounds include alkyl aluminum compounds, aluminum alkoxides, and aluminum acetylacetonates.

A coated zinc orthosilicate phosphor is described in copending application Ser. No. 06/902,265 (D 86-1-062), entitled PHOSPHOR PARTICLE, PHOSPHOR BLEND, AND FLUORESCENT LAMP. The zinc orthosilicate phosphor has a continuous aluminum oxide coating surrounding its outer surface and has the empirical formula $Zn_{(2.00-x-y)}Mn_xSiO_{(4.00-y)}(WO)_3)_z$, wherein x is from 0.04 to 0.15, y is from 0 to 0.05, and z is from 0 to 0.002. As set forth therein, the phosphor is prepared in such a manner that entirely all of the Mn is in the plus two valence state. Such preparation as is disclosed in detail is incorporated into the present specification.

The most preferred zinc orthosilicate phosphor comprises a bi-layer CVD coating as taught by Sigai and Klinedinst in U.S. Pat. No. 5,051,277 entitled "Method of Forming a Protective Bi-Layer Coating on Phosphor Particles" and U.S. Pat. No. 5,087,523 entitled "Phosphors with Improved Lumen Output and Lamps Made Therefrom". As set forth in the above patents, the green-emitting zinc orthosilicate phosphor activated with manganese, also known by the mineral name willemite can be improved by the application of a bi-layer coating prior to annealing. The bi-layer consists of a thin coating of silica applied between the base phosphor and a conformal alumina coating which is exposed to the mercury discharge. The silica coating prevents reaction between the zinc silicate phosphor and the alumina coating as set forth in the above patents.

A method for forming a continuous layer of silica on phosphor particles is disclosed in the above patents. The method comprises vaporizing a silicon containing precursor such as tetramethyloxysilane or tetraethoxyorthosilane into an inert carrier gas and passing this gas through the phosphor powder. The phosphor particles are enveloped in the precursor at a temperature of greater than 400 degrees Centigrade. An oxidizing gas is passed into the phosphor powder which reacts with the precursor to form a continuous coating of silica on the phosphor particles. The resulting silica coated phosphor is preferably further coated with alumina.

The third phosphor component is a blue color emitting phosphor which is typically a narrow band emitting phosphor. Typical blue emitting phosphors are europium activated barium magnesium aluminate, europium activated strontium cholorophosphate, and europium activated strontium barium calcium chlorophosphate. The preferred blue emitting phosphor is a barium magnesium aluminate activated by divalent europium and having a peak emission at 455 nm, such a phosphor is having the formula $BaMg_2Al_{16}O_{27}:Eu^{+2}$ is available as Sylvania Type 246 or 2461.

The quad-phosphor blend additionally includes an europium activate aluminate which is an additional green emitting phosphor component wherein the quad-blend substantially matches the desired predetermined color point. Aluminates that can be activated by $Eu^{+2}$ are described in Fluorescent Lamp Phosphors, Technology and Theory by Keith H. Butler, The Pennsylvania State University, 1980, pages 279 to 280. Aluminates that can be activated by Eu include the simple $MAl_2O_4$, the beta- alumina type $RAl_{11}O_{17}$, and the hexagonal aluminates $MAl_{12}O_{19}$. M is one of three ions Ca, Sr, or Ba and R represents Na, K, or Rb. The hexagonal aluminates with magnetoplumbite structure allow many variations in composition. The emission spectra of typical aluminate phosphors are given in Table 1A. In general the band widths are small and the color of the emission varies from deep blue to blue-green.

TABLE 1A

EUROPIUM-ACTIVATED ALUMINATES

| Composition | Emission Peak | Band Width |
|---|---|---|
| Simple aluminate | | |
| $Mg_2Al_2O_4$ | 480 | 90 |
| $Ca_2Al_2O_4$ | 437 | 50 |
| $Sr_2Al_2O_4$ | 519 | 80 |
| $Ba_2Al_2O_4$ | 500 | 80 |
| Beta-alumina | | |
| $NaAl_{11}O_{17}$ | 477 | 68 |
| $KAl_{11}O_{17}$ | 458 | 61 |
| $RbAl_{11}O_{17}$ | 448 | 64 |
| Hexagonal aluminate | | |
| $CaAl_{12}O_{19}$ | 410 | 22 |
| $SrAl_{12}O_{19}$ | 395 | 20 |
| $BaAl_{12}O_{19}$ | 440 | 20 |
| $Sr_2Mg_2Al_{22}O_{37}$ | 460 | 22 |
| $Ba_2Mg_2Al_{22}O_{37}$ | 455 | 19 |
| $SrMg_2Al_{10}O_{18}$ | 470 | 45 |
| $BaMg_2Al_{10}O_{27}$ | 450 | 72 |
| $Sr_{11}Mg_{12}Al_{110}O_{188}$ | 465 | 100 |

Figure 2:
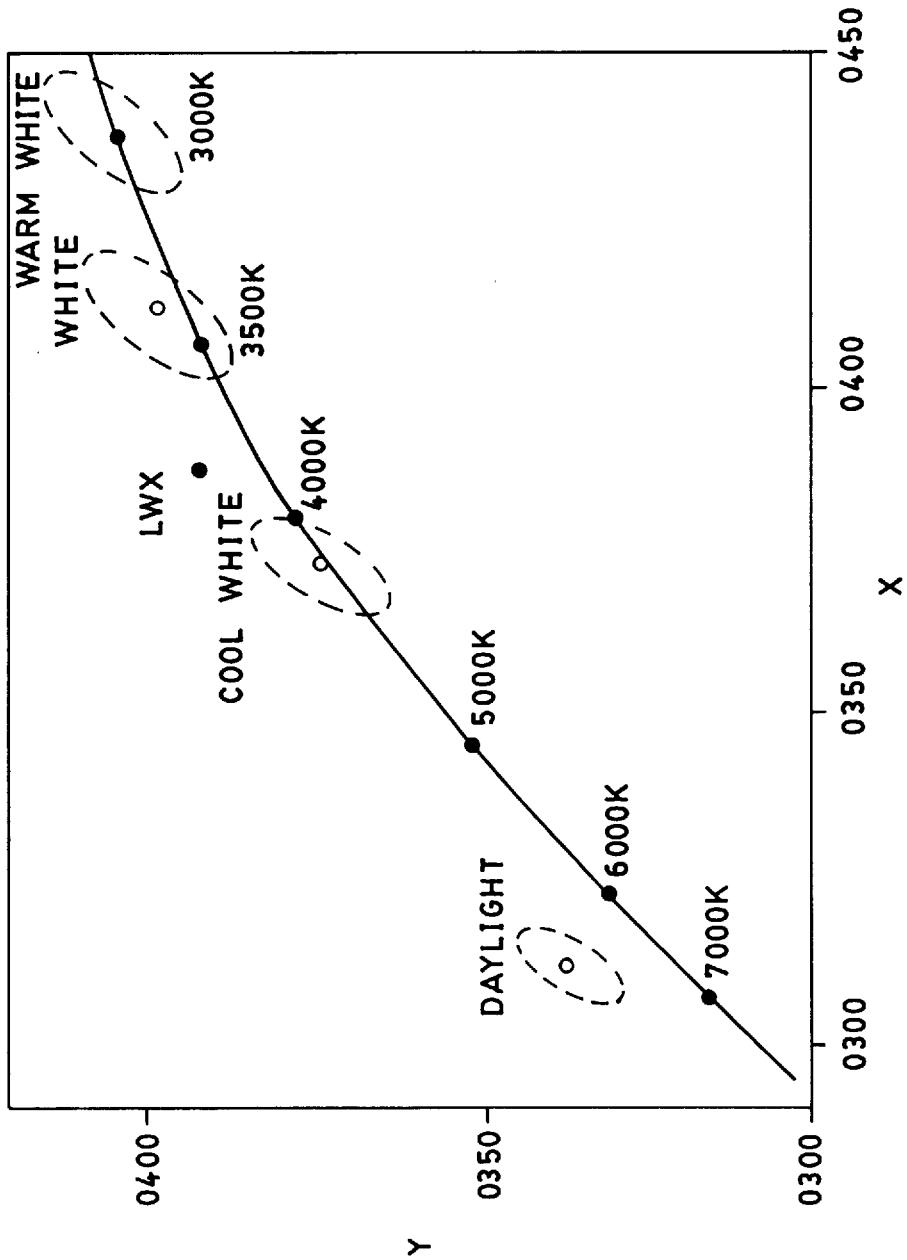
FIG. 2 is and x-y chromaticity diagram according to the 1931 standard showing spectroradiometrically determined assignments according to the ANSI Colorimetric Standard C78.3768-1966 for fluorescent lamps. See IES LIGHTING HANDBOOK, pg. 5–15, Fifth Edition, Illuminating Engineering Society, (1972).

FIG. 2 demonstrates illustrates an x-y cromaticity diagram showing the placement of the standard fluorescent colors of cool white, white, and warm white on a standard chromaticity diagram. The phosphor blend of the present invention is preferably in the region known as "Warm White".

The following detailed examples are given to enable those skilled in this art to more clearly understand and practice the present invention.

The phosphor layer is applied by techniques known in the art. A phosphor coating suspension is prepared by dispersing the phosphor particles in a water-based system employing polyethylene oxide and hydroxyethyl cellulose as the binders with water as the solvent. The phosphor suspension is applied by causing the suspension to flow down the inner surface of the bulb. Evaporation of the water results in an insoluble layer of phosphor particles adhering to the inside surface of the bulb wall. The layer is then dried. The first layer can be a mix of the quad blend with for example a calcium halophosphate activated by antimony and manganese, applied as a layer directly adjacent the glass from a liquid suspension. If the first layer is a halophosphate, then the second layer is the quad blend of the present invention which may be applied in the similar manner as the first layer.

The phosphor numbers given in the Examples below have identifying numbers utilized by GTE Products Corporation, Towanda, Pa., and are known as "Sylvania™" phosphors.

Figure 3:
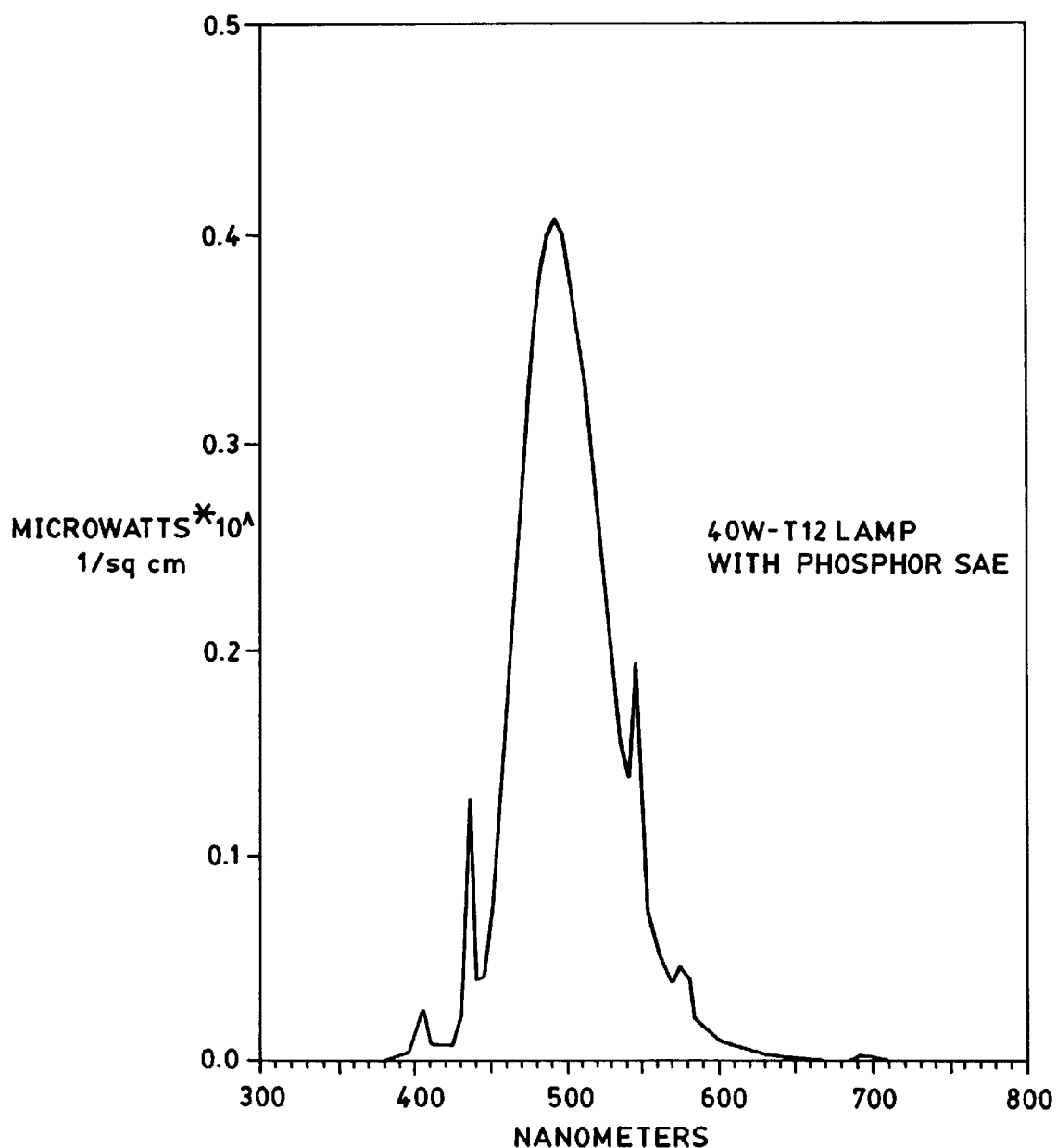
FIG. 3 is the Spectral Power Distribution (SPD) at 100 hours of operation for a 40 Watt-T12 fluorescent lamp containing the phosphor SAE (Strontium Aluminate:Europium).
Figure 4:
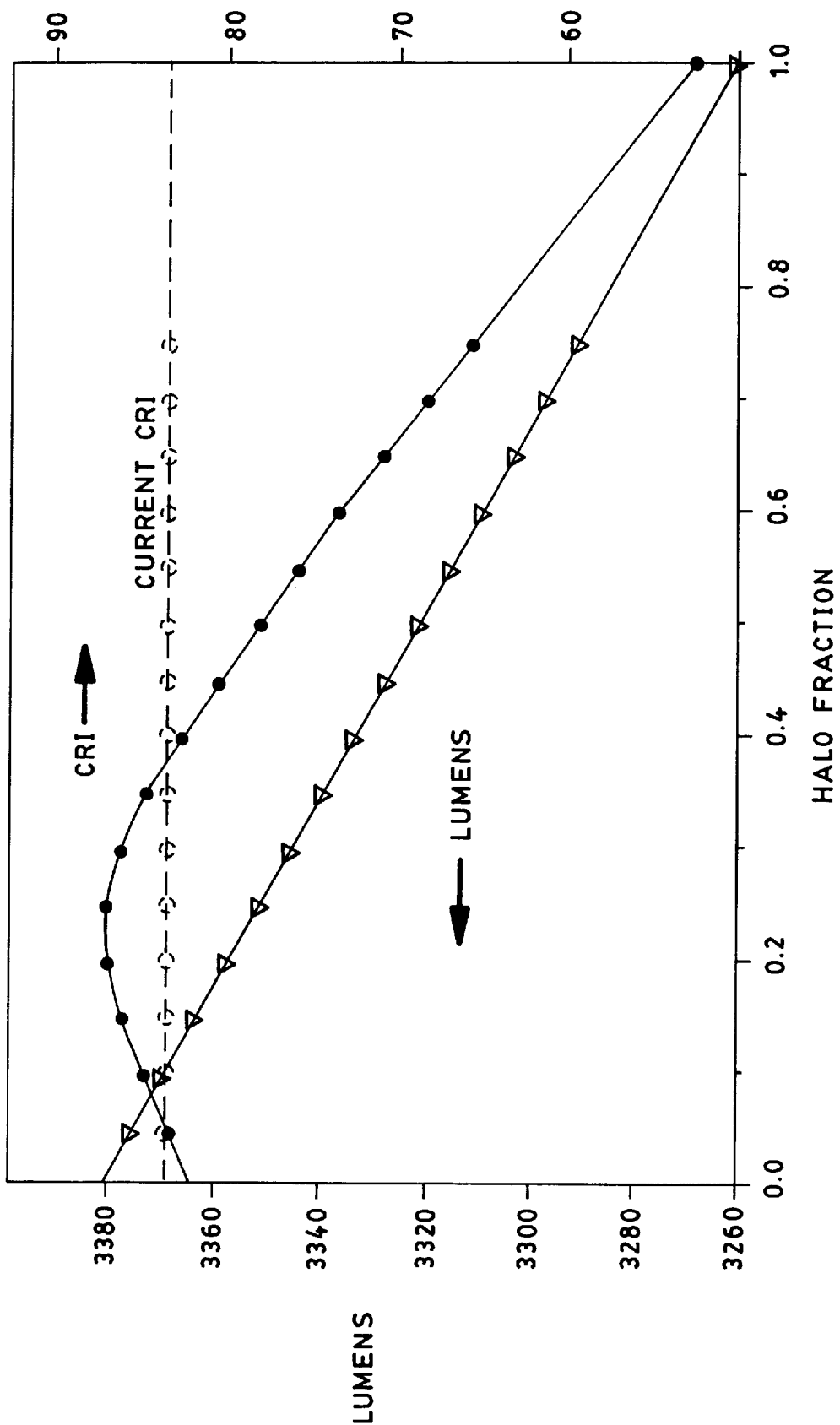
FIG. 4 is the dependence of Lumen Output (ordinate scale at left) and CRI (ordinate scale at right) on the halophosphate-blend fractional content, for a quad blend of composition: 0.069 (#246); 0.000 (SAE); 0.349 (#2288); 0.581 (#2345).
Figure 5:
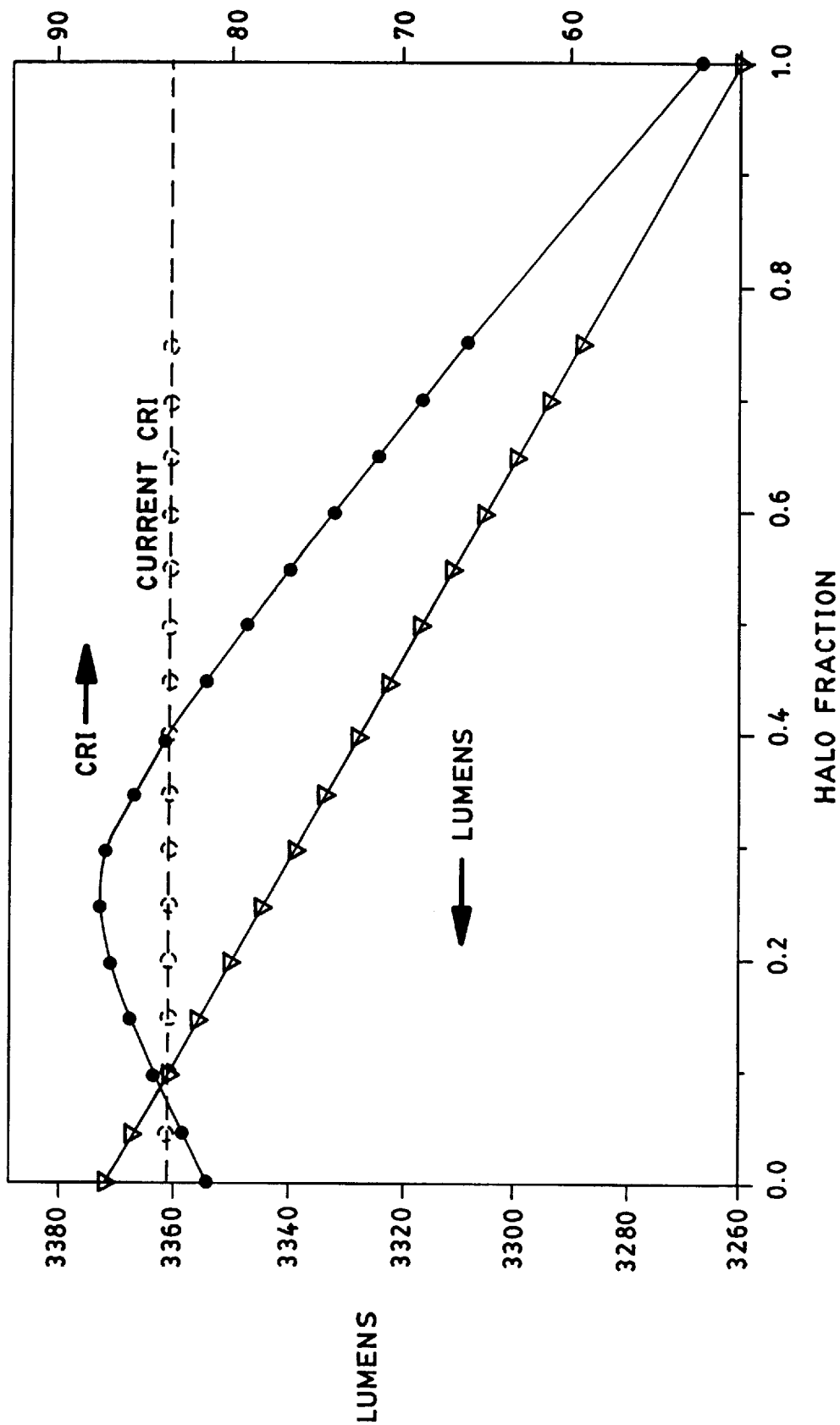
FIG. 5 is the dependence of Lumen Output (ordinate scale at left) and CRI (ordinate scale at right) on the halophosphate-blend fractional content, for a quad blend of composition: 0.056 (#246); 0.029 (SAE); 0.330 (#2288); 0.583 (#2345).
Figure 6:
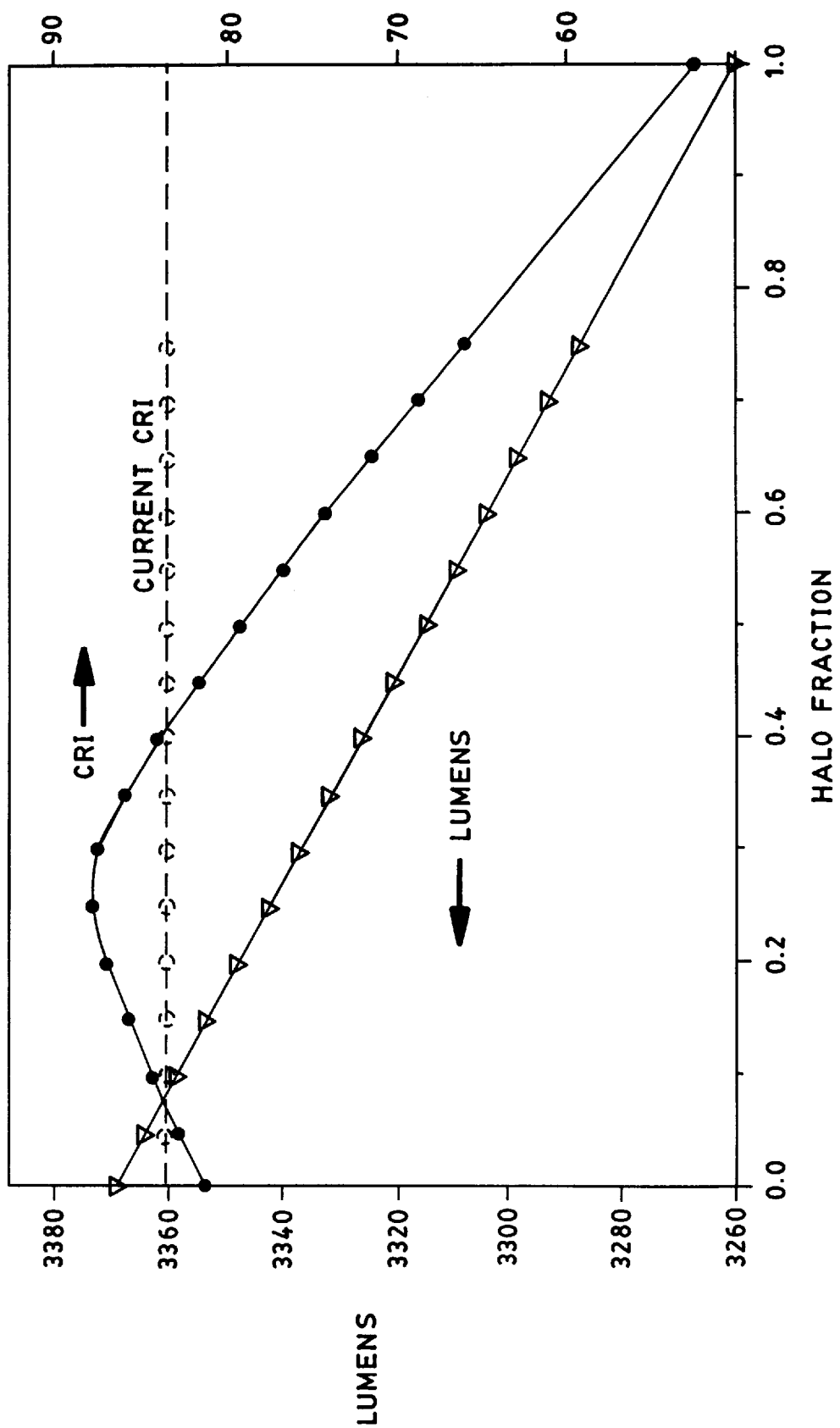
FIG. 6 is the dependence of Lumen Output (ordinate scale at left) and CRI (ordinate scale at right) on the halophosphate-blend fractional content, for a quad blend of composition: 0.053 (#246); 0.037 (SAE); 0.325 (#2288); 0.584 (#2345).
Figure 7:
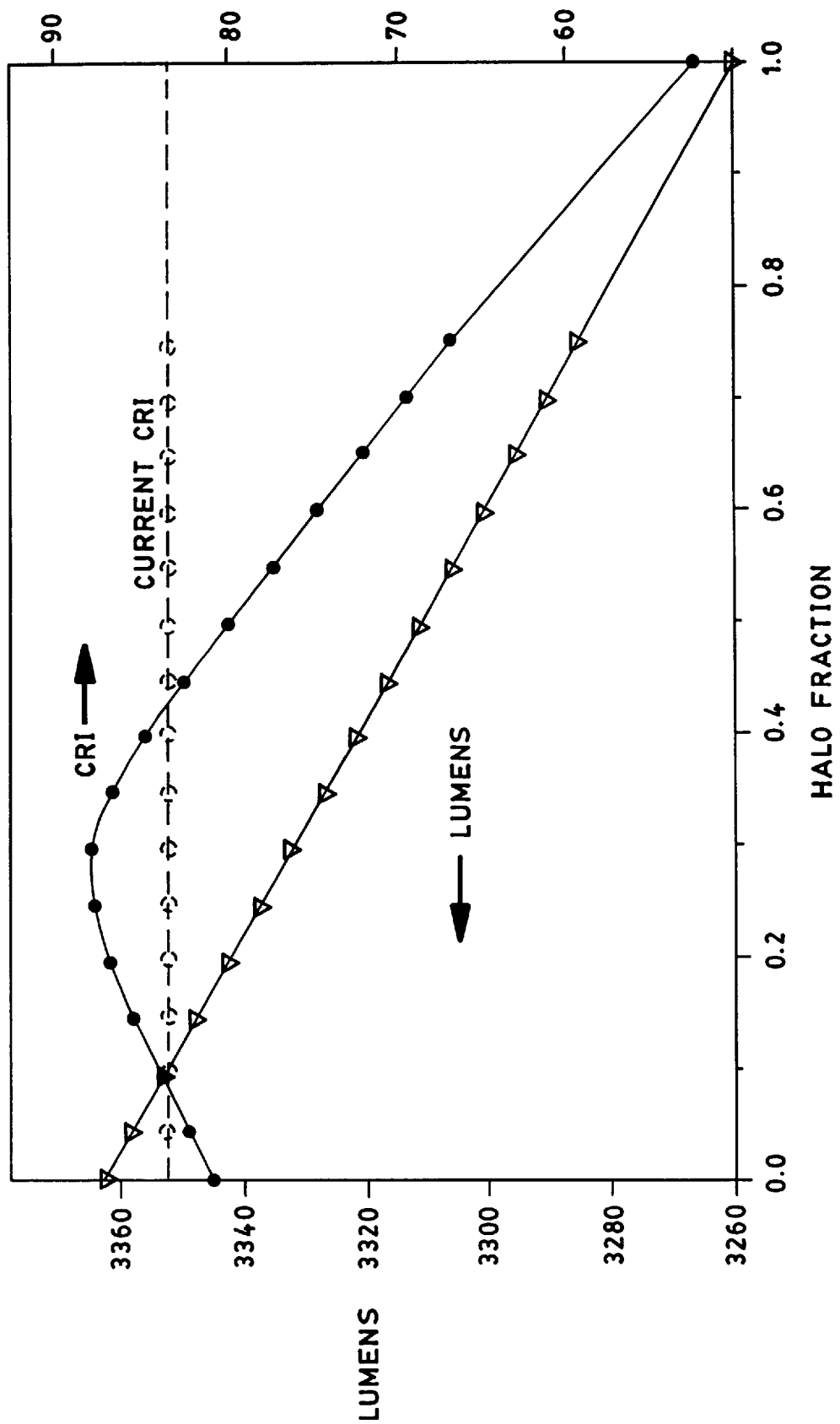
FIG. 7 is the dependence of Lumen Output (ordinate scale at left) and CRI (ordinate scale at right) on the halophosphate-blend fractional content, for a quad blend of composition: 0.042 (#246); 0.060 (SAE); 0.310 (#2288); 0.586 (#2345).
Figure 8:
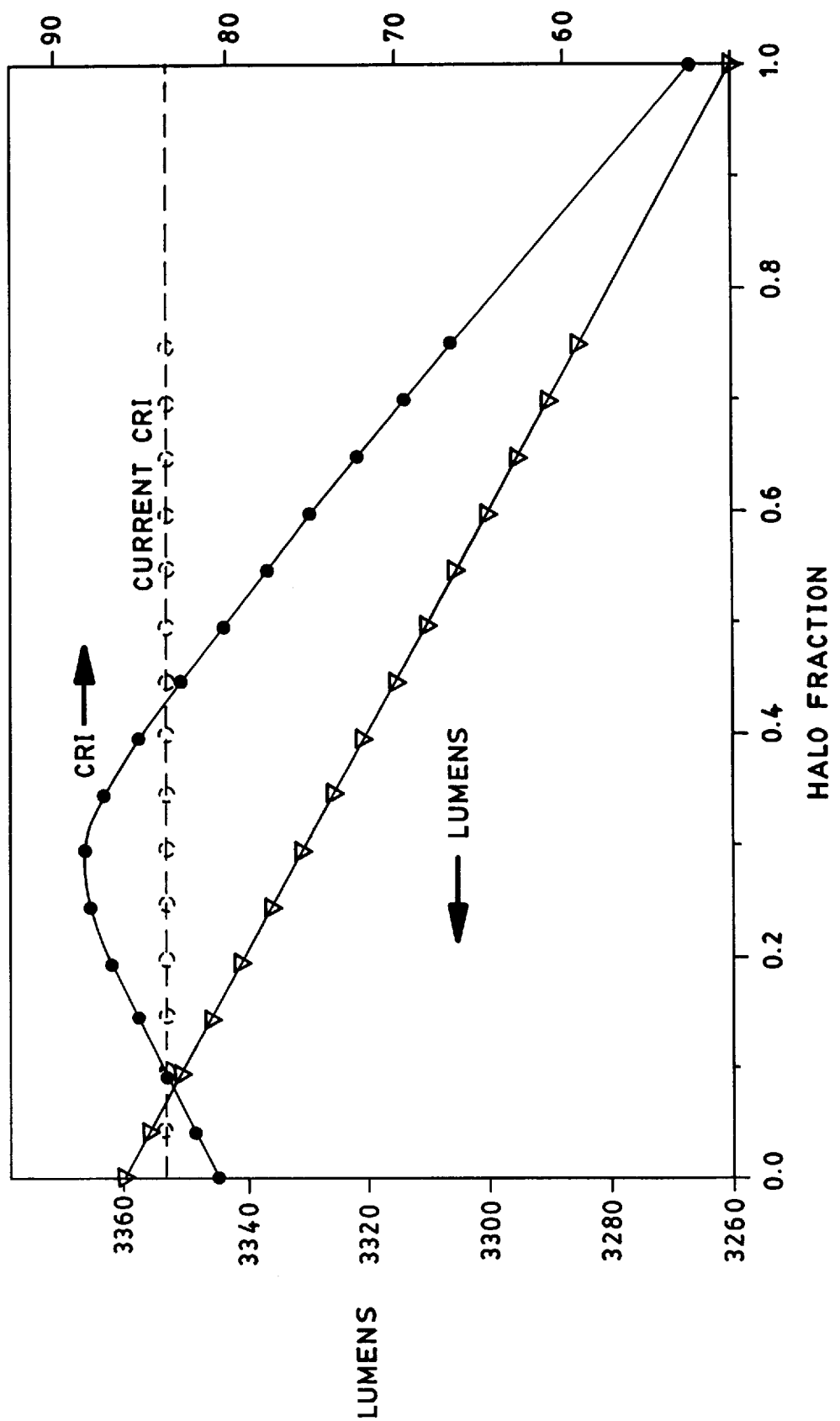
FIG. 8 is the dependence of Lumen Output (ordinate scale at left) and CRI (ordinate scale at right) on the halophosphate-blend fractional content, for a quad blend of composition: 0.038 (#246); 0.071 (SAE); 0.303 (#2288); 0.587 (#2345).
Figure 9:
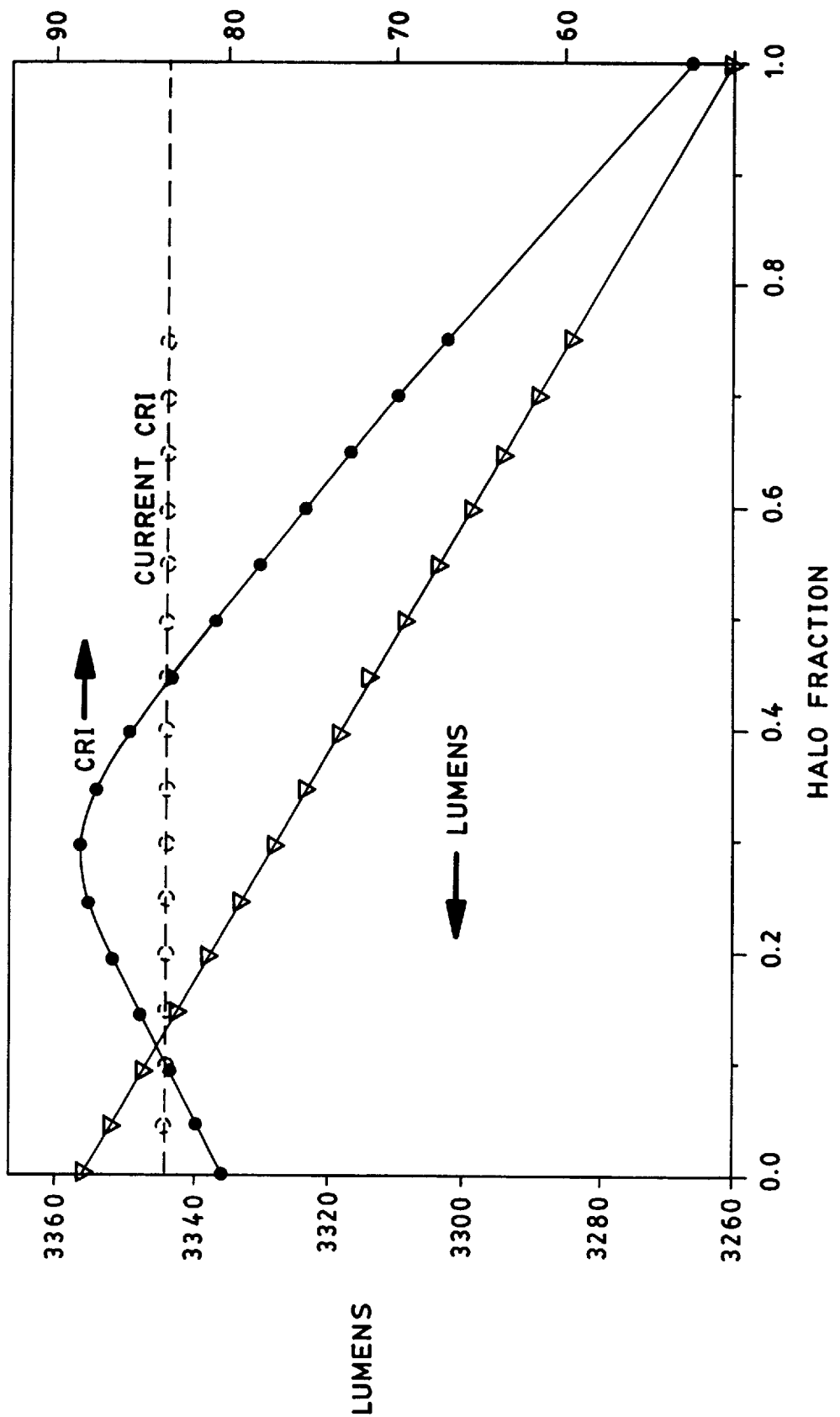
FIG. 9 is the dependence of Lumen Output (ordinate scale at left) and CRI (ordinate scale at right) on the halophosphate-blend fractional content, for a quad blend of composition: 0.033 (#246); 0.082 (SAE); 0.297 (#2288); 0.588 (#2345).
Figure 10:
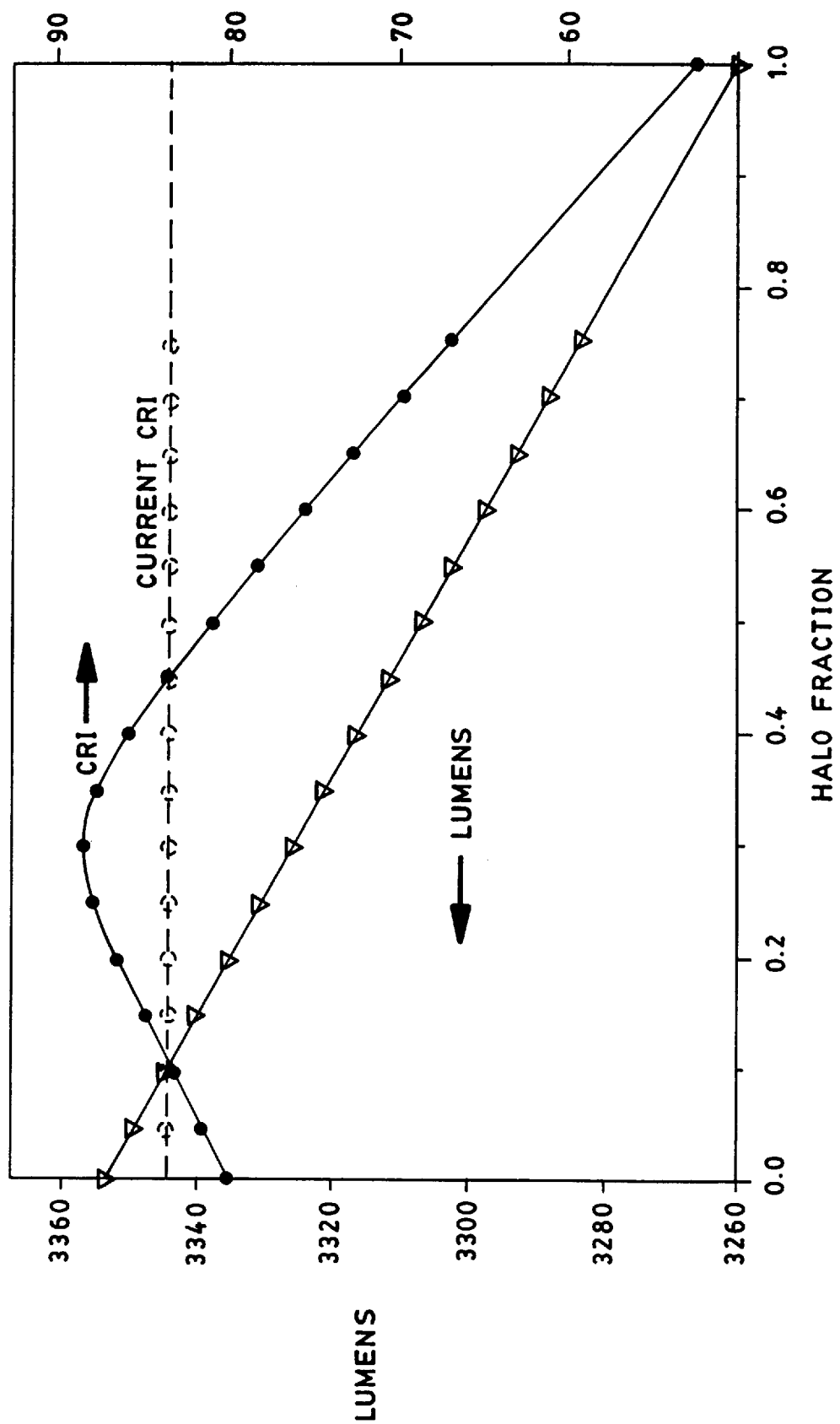
FIG. 10 is the dependence of Lumen Output (ordinate scale at left) and CRI (ordinate scale at right) on the halophosphate-blend fractional content, for a quad blend of composition: 0.029 (#246); 0.092 (SAE); 0.290 (#2288); 0.588 (#2345).
Figure 11:
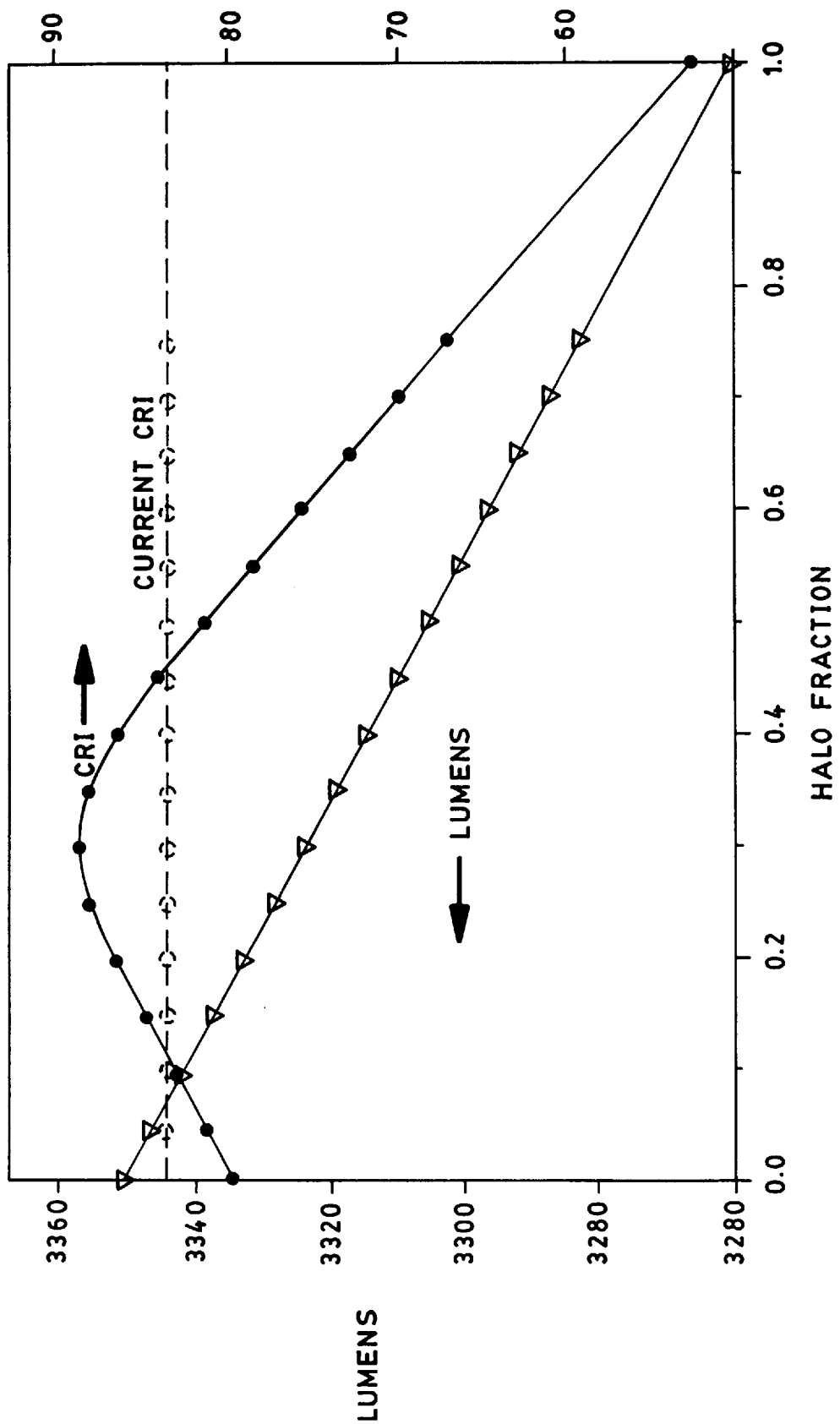
FIG. 11 is the dependence of Lumen Output (ordinate scale at left) and CRI (ordinate scale at right) on the halophosphate-blend fractional content, for a quad blend of composition: 0.024 (#246); 0.102 (SAE); 0.283 (#2288); 0.589 (#2345).
Figure 12:
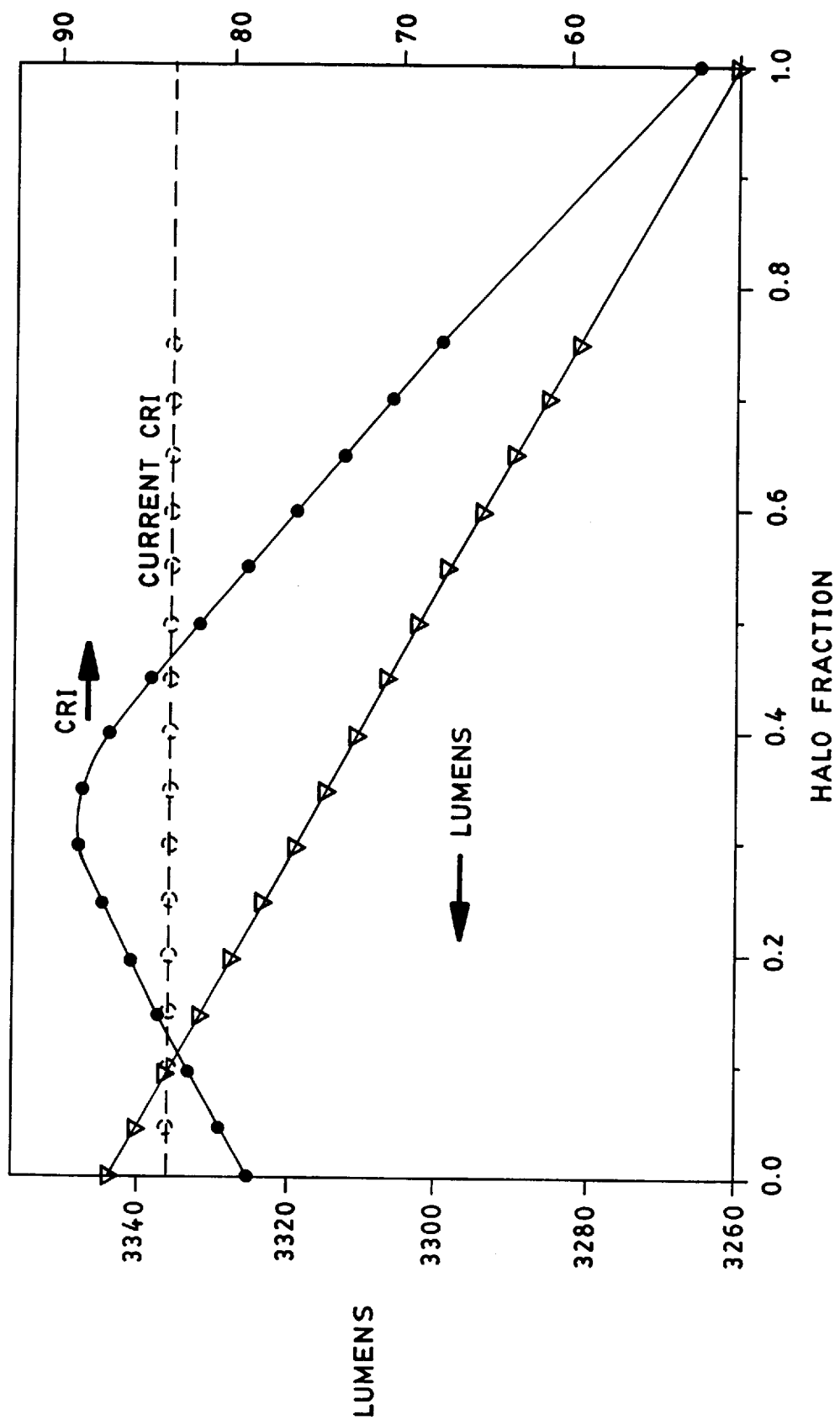
FIG. 12 is the dependence of Lumen Output (ordinate scale at left) and CRI (ordinate scale at right) on the halophosphate-blend fractional content, for a quad blend of composition: 0.014 (#246); 0.124 (SAE); 0.269 (#2288); 0.591 (#2345).
Figure 13:
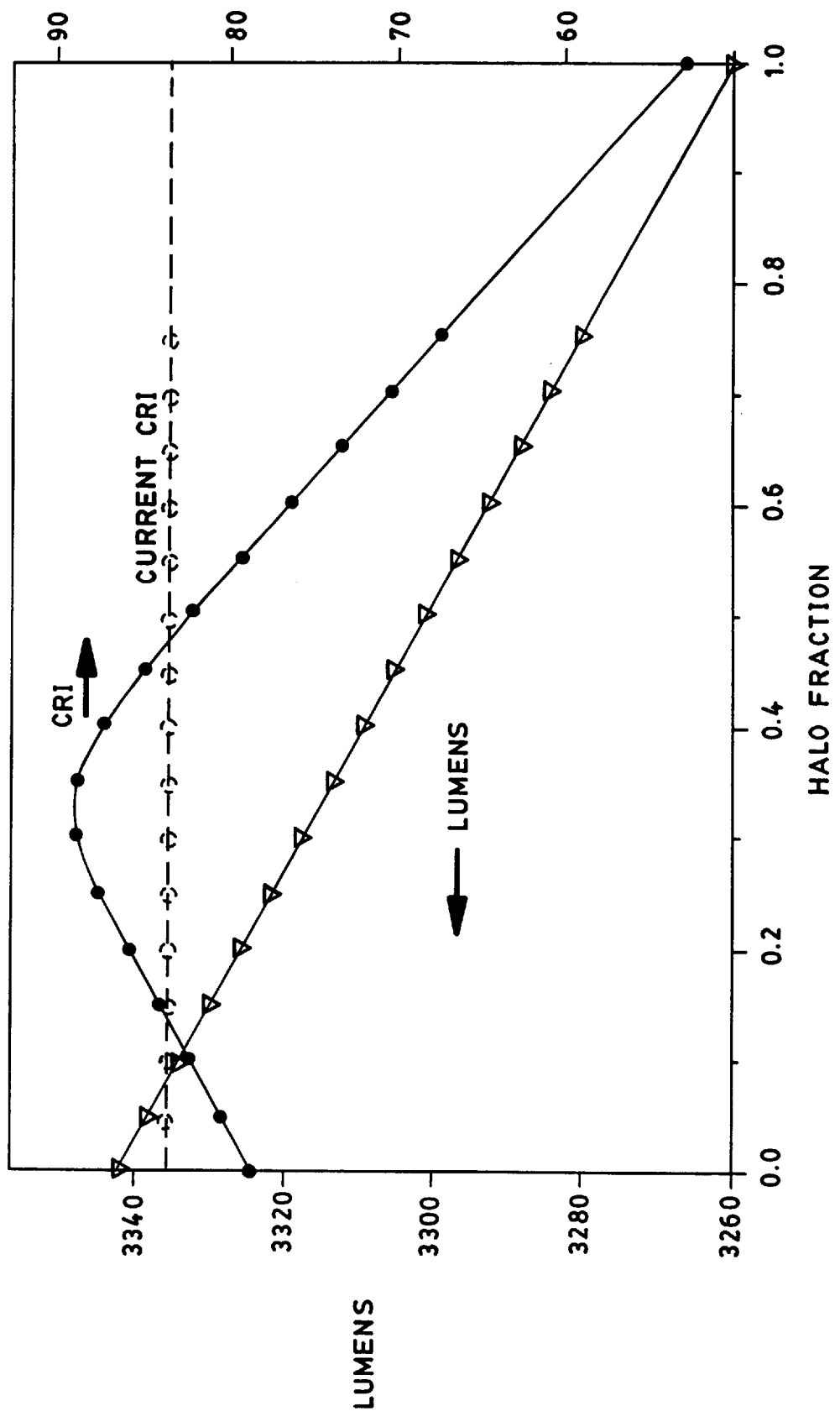
FIG. 13 is the dependence of Lumen Output (ordinate scale at left) and CRI (ordinate scale at right) on the halophosphate-blend fractional content, for a quad blend of composition: 0.011 (#246); 0.131 (SAE); 0.265 (#2288); 0.591 (#2345).
Figure 14:
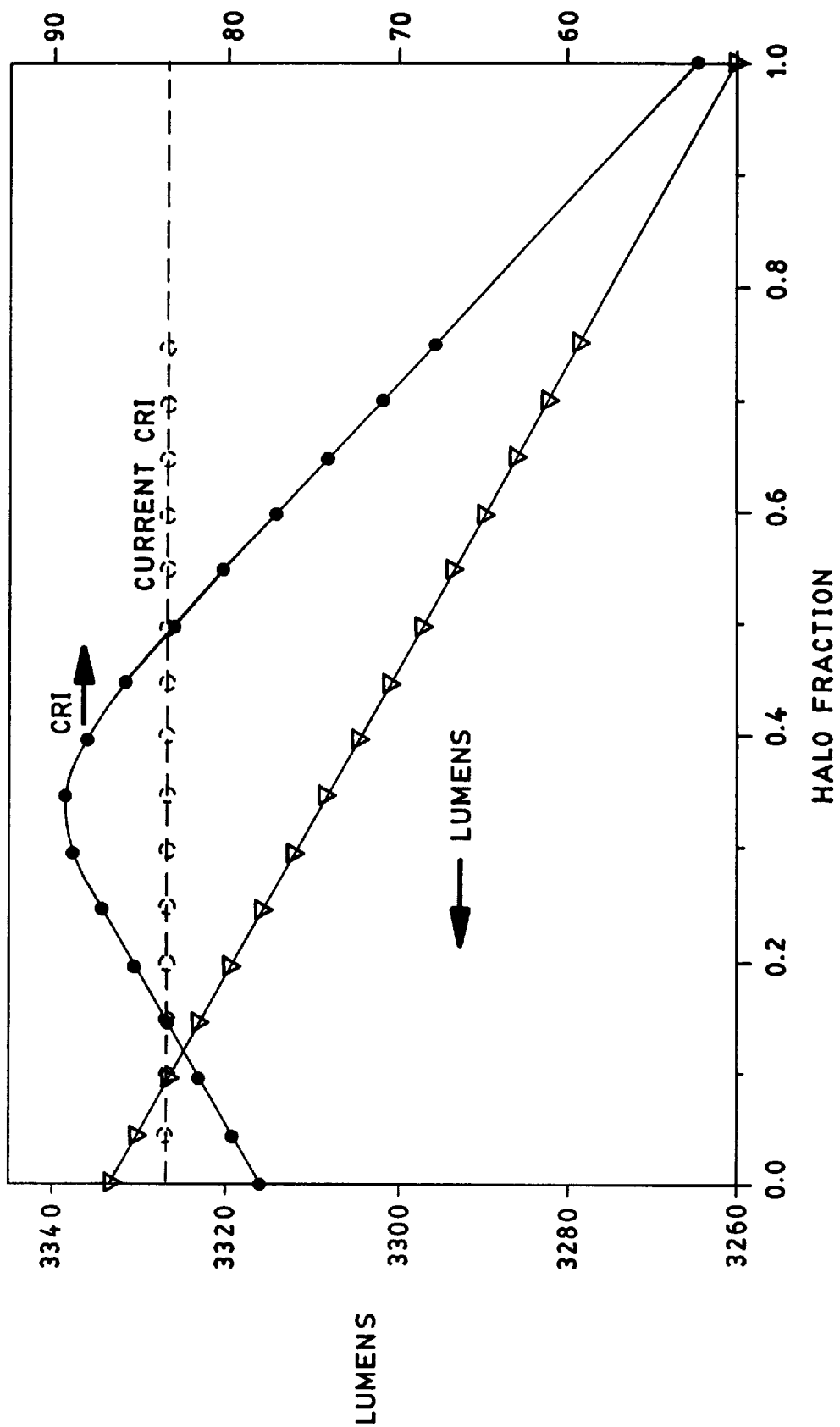
FIG. 14 is the dependence of Lumen Output (ordinate scale at left) and CRI (ordinate scale at right) on the halophosphate-blend fractional content, for a quad blend of composition: 0.000 (#246); 0.158 (SAE); 0.247 (#2288); 0.593 (#2345).

By combining phosphors #246, #2288, #2345, and SAE (Strontium Aluminate Europium) with metameric halophosphate blends, the predicted values of the CRI approach 90 for 100 hours brightness levels exceeding 3,300 lumens at a color temperature at 3,000K. The spectral power distribution (SPD) for a 40 Watt-T12 lamp containing phosphor SAE is shown in FIG. 3, at 100 hours of operation.

In what follows the quad-blend flormuation is expressed in Single-Component-Lamp (SCL) units; similarly the metameric mixes of the quad-blend with the halophosphate blend is expressed in Single-Blend-Lamp (SBL) units.

TABLE 1

Lumen-output values at 100 hours for single-phosphor lamps (40 Watts-T12) used in the calculations. Sylvania Phosphor Types.

| Phosphor Type | Lumens | Composition/Trade name |
|---|---|---|
| #SAE | 2,674 | Sr Aluminate:Eu |
| #2288 | 4,900 | Zn orthosilicate:Mn |
| #2345 | 2,750 | Yttrium Oxide:Eu |
| #246 | 1,006 | Ba aluminate:Eu |
| #4300 | 3,260 | Warm White |
| #4381 | 3,410 | Yellow Halo |
| #4459 | 3,100 | Cool White |

The computations were specifically aimed at obtaining phosphor blends characterized in 40 Watt-T12 fluorescent lamps by a color point of x=0.437 and y=0.406, and a correlated color temperature of ~3,000K. Fluorescent lamps of this type are marketed by GTE Products Corporation under the trade name of 'Color Brite' lamps.

Sylvania phosphor types #246, #2288, and #2345, and phosphor SAE (Strontium Aluminate:Eu) were combined so as to obtain in lamps the color point corresponding in the chromaticity plane to the color temperature of ~3,000K. Pertinent single-component lamp data are listed in Table 1. Commercially-available halophosphate phosphors co-activated with Sb and Mn (see Table 1) were also blended, so as to achieve the CB color point. This led to the halophosphate tri-component blend of SCL formulation:

CB HALO:0.031 (#4381); 0.028 (#4459); 0.941 (Warm White)

Results

Starting from a three-component blend based on phosphors #246, #2288, and #2345, and targeted for a color point of x=0.437 and y=0.406, we consider first the effect of adding phosphor SAE, and reformulating the blend, so as to achieve the same target color-point (Table 2). Inspection of Table 2 shows that, as the SAE content progressively increases in the phosphor blend, the predicted lumens and CRI of the blend decrease monotonically. The range of brightness loss is rather limited, ~47 lumens, i.e, approximately 1.4%; the CRI in turn, drops by approximately 4 units from 81.8 to 77.6.

The advantage of introducing the SAE phosphor in the blend is only realized when the original, or 'main', phosphor blend is combined with the metameric CB halo-blend. In such cases the modelling predicts a marked improvement in CRI.

The results of this metameric mixing, when applied to the blends listed in Table 2, are summarized in tabular form in Tables 3 to 13, and graphically in FIGS. 1 to 11. In the Figures the horizontal line labelled 'CURRENT CRI' provides a convenient bench-mark to follow the evolution of the CRI. Such an horizontal line corresponds to a CRI value of 83.5.

For a specified 'main'-blend composition, the addition of the CB Halo increases the overall CRI, over a range of fractional values of the halo blend. As the CB halo becomes the dominant component, though, the CRI drops drastically, towards the limiting value of 52.3 exhibited by the CB halo-blend.

Next, an overview of the tabulated results is present in summary form in Table 14, with the primary aim of underscoring the composition of metameric mixes that result in the highest CRI values. Therefore, the entries of Table 14 are given in sets of two contiguous rows, with the upper row relating to the predicted results as applying to the 'main' formulation. The lower row contains the prediction for the particular metameric mix that exhibits the highest CRI value.

It follows from inspection of Table 14 that the fractional halo content for maximum CRI will increase from 0.25 to 0.35, as the SAE blend content rises. At the higher SAE content, the absolute value of the maximum CRI also rises, to reach a peak value of 89.4 at the end-of-series blend composition devoid of phosphor #246 (last row of Table 14). Given the results of Table 2, on the drop in CRI with increased SAE content, it follows that the overall increment in CRI on halo addition will be most pronounced at high SAE contents.

A point to be underscored is that even at the highest CRI value (89.4) the predicted brightness at 100 hrs is still expected to exceed 3,300 lumens, as long as the lamp data of Table 1 apply.

Finally, we recall that the results of the modelling are applicable not only to a mechanical mixing of the 'main' and halo blend, but also to the case of 'two-layer' blend configurations, as long as the SBL fractions for the main and halo blend refer to the fraction of avilable UV radiation converted by each individual blend.

TABLE 2

Four-component blends containing phosphors #246, SAE, #2288, and #2345 (in order of increasing SAE content). $T_c$~3,000K.

Single-Component-Lamp Fractions of

| #246 | #SAE | #2288 | #2345 | Lumens | CRI |
|---|---|---|---|---|---|
| 0.069 | 0.000 | 0.349 | 0.581 | 3381.6 | 81.8 |
| 0.056 | 0.029 | 0.330 | 0.583 | 3372.7 | 81.3 |

TABLE 2-continued

Four-component blends containing phosphors #246, SAE, #2288, and #2345 (in order of increasing SAE content). $T_c$~3,000K.

Single-Component-Lamp Fractions of

| #246 | #SAE | #2288 | #2345 | Lumens | CRI |
|---|---|---|---|---|---|
| 0.053 | 0.037 | 0.325 | 0.584 | 3370.5 | 81.1 |
| 0.042 | 0.060 | 0.310 | 0.586 | 3363.6 | 80.6 |
| 0.038 | 0.071 | 0.303 | 0.587 | 3360.4 | 80.4 |
| 0.033 | 0.082 | 0.297 | 0.588 | 3357.1 | 80.1 |
| 0.029 | 0.092 | 0.290 | 0.588 | 3354.2 | 79.8 |
| 0.024 | 0.102 | 0.283 | 0.589 | 3351.0 | 79.5 |
| 0.014 | 0.124 | 0.269 | 0.591 | 3344.4 | 78.8 |
| 0.011 | 0.131 | 0.265 | 0.591 | 3342.3 | 78.6 |
| 0.000 | 0.158 | 0.247 | 0.593 | 3334.0 | 77.6 |

TABLE 3

Effect of halophosphate addition to a 3,000K blend containing phosphors #246, SAE, #2288, and #2345. (See also FIG. 1).
MAIN BLEND: 0.069 (#246); 0.000 (SAE); 0.349 (#2288); 0.581 (#2345)
HALO BLEND: 0.031 (#4381); 0.028 (#4451); 0.941 (Warm White)

| Halo Fract. | Lumens | CRI |
|---|---|---|
| .00 | 3381.6 | 81.78 |
| .05 | 3375.5 | 83.31 |
| .10 | 3369.4 | 84.72 |
| .15 | 3363.4 | 85.89 |
| .20 | 3357.3 | 86.80 |
| .25 | 3351.2 | 87.12 |
| .30 | 3345.1 | 86.29 |
| .35 | 3339.1 | 84.70 |
| .40 | 3333.0 | 82.80 |
| .45 | 3326.9 | 80.67 |
| .50 | 3320.8 | 78.37 |
| .55 | 3314.8 | 75.97 |
| .60 | 3308.7 | 73.51 |
| .65 | 3302.6 | 70.99 |
| .70 | 3296.5 | 68.43 |
| .75 | 3290.5 | 65.84 |
| 1.00 | 3260.1 | 52.33 |

CRX INDEX: 2709 2725

TABLE 4

Effect of halophosphate addition to a 3,000K blend containing phosphors #246, SAE, #2288, and #2345. (See also FIG. 2).
MAIN BLEND: 0.056 (#246), 0.029 (SAE), 0.330 (#2288), 0.583 (#2345)
HALO BLEND: 0.031 (#4381); 0.028 (#4459); 0.941 (#4300)
(in SCL units)

| Halo Fraction* | Lumens | CRI |
|---|---|---|
| .00 | 3372.7 | 81.29 |
| .05 | 3367.1 | 82.89 |
| .10 | 3361.5 | 84.44 |
| .15 | 3355.8 | 85.87 |
| .20 | 3350.2 | 87.00 |
| .25 | 3344.6 | 87.74 |
| .30 | 3339.0 | 87.47 |
| .35 | 3333.3 | 85.90 |
| .40 | 3327.7 | 83.93 |
| .45 | 3322.1 | 81.69 |
| .50 | 3316.4 | 79.28 |
| .55 | 3310.8 | 76.78 |
| .60 | 3305.2 | 74.21 |
| .65 | 3299.5 | 71.60 |
| .70 | 3293.9 | 68.94 |
| .75 | 3288.3 | 66.25 |
| 1.00 | 3260.1 | 52.33 |

CRX INDEX: 2726 2742

TABLE 5

Effect of halophosphate addition to a 3,000K blend containing phosphors #246, SAE, #2288, and #2345. (See also FIG. 3).
MAIN BLEND: 0.053 (#246), 0.037 (SAE), 0.325 (#2288), 0.584 (#2345)
HALO BLEND: 0.031 (#4381); 0.028 (#4459); 0.941 (#4300)
(in SCL units)

| Halo Fraction* | Lumens | CRI |
|---|---|---|
| .00 | 3370.5 | 81.14 |
| .05 | 3365.0 | 82.76 |
| .10 | 3359.5 | 84.33 |
| .15 | 3354.0 | 85.81 |
| .20 | 3348.5 | 87.02 |
| .25 | 3342.9 | 87.82 |
| .30 | 3337.4 | 87.73 |
| .35 | 3331.9 | 86.19 |
| .40 | 3326.4 | 84.21 |
| .45 | 3320.8 | 81.94 |
| .50 | 3315.3 | 79.51 |
| .55 | 3309.8 | 76.98 |
| .60 | 3304.3 | 74.38 |
| .65 | 3298.8 | 71.74 |
| .70 | 3293.2 | 69.06 |
| .75 | 3287.7 | 66.35 |
| 1.00 | 3260.1 | 52.33 |

CRX INDEX: 2743 2759
*In SBL photometric units

TABLE 6

Effect of halophosphate addition to a 3,000K blend containing phosphors #246, SAE, #2288, and #2345. (See also FIG. 4).
MAIN BLEND: 0.042 (#246), 0.060 (SAE), 0.310 (#2288), 0.586 (#2345)
HALO BLEND: 0.031 (#4381); 0.028 (#4459); 0.941 (#4300)
(in SCL units)

| Halo Fraction* | Lumens | CRI |
|---|---|---|
| .00 | 3363.6 | 80.64 |
| .05 | 3358.4 | 82.30 |
| .10 | 3353.3 | 83.94 |
| .15 | 3348.1 | 85.53 |
| .20 | 3342.9 | 86.97 |
| .25 | 3337.7 | 88.01 |
| .30 | 3332.6 | 88.35 |
| .35 | 3327.4 | 87.08 |
| .40 | 3322.2 | 85.08 |
| .45 | 3317.0 | 82.74 |
| .50 | 3311.9 | 80.22 |
| .55 | 3306.7 | 77.60 |
| .60 | 3301.5 | 74.93 |
| .65 | 3296.3 | 72.21 |
| .70 | 3291.1 | 69.46 |
| .75 | 3286.0 | 66.67 |
| 1.00 | 3260.1 | 52.33 |

CRX INDEX: 2760 2776
*In SBL photometric units

TABLE 7

Effect of halophosphate addition to a 3,000K blend containing phosphors #246, SAE, #2288, and #2345. (See also FIG. 5).
MAIN BLEND: 0.038 (#246), 0.071 (SAE), 0.303 (#2288), 0.587 (#2345)
HALO BLEND: 0.031 (#4381); 0.028 (#4459); 0.941 (#4300)
(in SCL units)

| Halo Fraction* | Lumens | CRI |
|---|---|---|
| .00 | 3360.4 | 80.39 |
| .05 | 3355.4 | 82.06 |
| .10 | 3350.4 | 83.73 |
| .15 | 3345.3 | 85.35 |
| .20 | 3340.3 | 86.88 |
| .25 | 3335.3 | 88.05 |
| .30 | 3330.3 | 88.54 |
| .35 | 3325.3 | 87.47 |
| .40 | 3320.3 | 85.48 |
| .45 | 3315.3 | 83.10 |
| .50 | 3310.2 | 80.54 |
| .55 | 3305.2 | 77.89 |
| .60 | 3300.2 | 75.18 |
| .65 | 3295.2 | 72.42 |
| .70 | 3290.2 | 69.64 |
| .75 | 3285.2 | 66.82 |
| 1.00 | 3260.1 | 52.33 |

CRX INDEX: 2777 2793
*In SBL photometric units

TABLE 8

Effect of halophosphate addition to a 3,000K blend containing phosphors #246, SAE, #2288, and #2345. (See also FIG. 6).
MAIN BLEND: 0.033 (#246), 0.082 (SAE), 0.297 (#2288), 0.588 (#2345)
HALO BLEND: 0.031 (#4381); 0.028 (#4459); 0.941 (#4300)
(in SCL units)

| Halo Fraction* | Lumens | CRI |
|---|---|---|
| .00 | 3357.1 | 80.11 |
| .05 | 3352.3 | 81.81 |
| .10 | 3347.4 | 83.50 |
| .15 | 3342.6 | 85.16 |
| .20 | 3337.7 | 86.75 |
| .25 | 3332.9 | 88.06 |
| .30 | 3328.0 | 88.69 |
| .35 | 3323.2 | 87.83 |
| .40 | 3318.3 | 85.88 |
| .45 | 3313.5 | 83.47 |
| .50 | 3308.6 | 80.87 |
| .55 | 3303.8 | 78.18 |
| .60 | 3298.9 | 75.43 |
| .65 | 3294.1 | 72.64 |
| .70 | 3289.2 | 69.82 |
| .75 | 3284.4 | 66.96 |
| 1.00 | 3260.1 | 52.33 |

CRX INDEX: 2794 2810
*In SBL photometric units

TABLE 9

Effect of halophosphate addition to a 3,000K blend containing phosphors #246, SAE, #2288, and #2345. (See also FIG. 7).
MAIN BLEND: 0.029 (#246), 0.092 (SAE), 0.290 (#2288), 0.588 (#2345)
HALO BLEND: 0.031 (#4381); 0.028 (#4459); 0.941 (#4300)
(in SCL units)

| Halo Fraction* | Lumens | CRI |
|---|---|---|
| .00 | 3354.2 | 79.84 |
| .05 | 3349.5 | 81.57 |
| .10 | 3344.8 | 83.28 |
| .15 | 3340.1 | 84.97 |
| .20 | 3335.3 | 86.60 |
| .25 | 3330.6 | 88.04 |
| .30 | 3325.9 | 88.80 |
| .35 | 3321.2 | 88.11 |
| .40 | 3316.5 | 86.23 |
| .45 | 3311.8 | 83.80 |
| .50 | 3307.1 | 81.17 |
| .55 | 3302.4 | 78.44 |

TABLE 9-continued

Effect of halophosphate addition to a 3,000K blend containing
phosphors #246, SAE, #2288, and #2345. (See also FIG. 7).
MAIN BLEND: 0.029 (#246), 0.092 (SAE), 0.290 (#2288), 0.588 (#2345)
HALO BLEND: 0.031 (#4381); 0.028 (#4459); 0.941 (#4300)
(in SCL units)

| Halo Fraction* | Lumens | CRI |
| --- | --- | --- |
| .60 | 3297.7 | 75.66 |
| .65 | 3293.0 | 72.84 |
| .70 | 3288.3 | 69.98 |
| .75 | 3283.6 | 67.10 |
| 1.00 | 3260.1 | 52.33 |

CRX INDEX: 2811 2827
*In SBL photometric units

TABLE 10

Effect of halophosphate addition to a 3,000K blend containing
phosphors #246, SAE, #2288, and #2345. (See also FIG. 8).
MAIN BLEND: 0.024 (#246), 0.102 (SAE), 0.283 (#2288), 0.589 (#2345)
HALO BLEND: 0.031 (#4381); 0.028 (#4459); 0.941 (#4300)
(in SCL units)

| Halo Fraction* | Lumens | CRI |
| --- | --- | --- |
| .00 | 3351.0 | 79.54 |
| .05 | 3346.5 | 81.29 |
| .10 | 3341.9 | 83.03 |
| .15 | 3337.4 | 84.75 |
| .20 | 3332.8 | 86.43 |
| .25 | 3328.3 | 87.97 |
| .30 | 3323.7 | 88.90 |
| .35 | 3319.2 | 88.37 |
| .40 | 3314.6 | 86.60 |
| .45 | 3310.1 | 84.15 |
| .50 | 3305.6 | 81.48 |
| .55 | 3301.0 | 78.72 |
| .60 | 3296.5 | 75.90 |
| .65 | 3291.9 | 73.04 |
| .70 | 3287.4 | 70.15 |
| .75 | 3282.8 | 67.24 |
| 1.00 | 3260.1 | 52.33 |

CRX INDEX: 2828 2844
*In SBL photometric units

TABLE 11

Effect of halophosphate addition to a 3,000K blend containing
phosphors #246, SAE, #2288, and #2345. (See also FIG. 9).
MAIN BLEND: 0.014 (#246); 0.124 (SAE); 0.269 (#2288); 0.591 (#2345)
HALO BLEND: 0.031 (#4381); 0.028 (#4459); 0.941 (#4300)
(in SCL units)

| Halo Fraction* | Lumens | CRI |
| --- | --- | --- |
| .00 | 3344.4 | 78.85 |
| .05 | 3340.2 | 80.67 |
| .10 | 3336.0 | 82.47 |
| .15 | 3331.7 | 84.25 |
| .20 | 3327.5 | 86.01 |
| .25 | 3323.3 | 87.69 |
| .30 | 3319.1 | 89.00 |
| .35 | 3314.9 | 88.84 |
| .40 | 3310.7 | 87.31 |
| .45 | 3306.5 | 84.88 |
| .50 | 3302.2 | 82.13 |
| .55 | 3298.0 | 79.29 |
| .60 | 3293.8 | 76.40 |
| .65 | 3289.6 | 73.47 |
| .70 | 3285.4 | 70.51 |

TABLE 11-continued

Effect of halophosphate addition to a 3,000K blend containing
phosphors #246, SAE, #2288, and #2345. (See also FIG. 9).
MAIN BLEND: 0.014 (#246); 0.124 (SAE); 0.269 (#2288); 0.591 (#2345)
HALO BLEND: 0.031 (#4381); 0.028 (#4459); 0.941 (#4300)
(in SCL units)

| Halo Fraction* | Lumens | CRI |
| --- | --- | --- |
| .75 | 3281.2 | 67.53 |
| 1.00 | 3260.1 | 52.33 |

CRX INDEX: 2845 2861
*In SBL photometric units

TABLE 12

Effect of halophosphate addition to a 3,000K blend containing
phosphors #246, SAE, #2288, and #2345. (See also FIG. 10).
MAIN BLEND: 0.011 (#246), 0.131 (SAE), 0.265 (#2288), 0.591 (#2345)
HALO BLEND: 0.031 (#4381); 0.028 (#4459); 0.941 (#4300)
(in SCL units)

| Halo Fraction* | Lumens | CRI |
| --- | --- | --- |
| .00 | 3342.3 | 78.62 |
| .05 | 3338.2 | 80.46 |
| .10 | 3334.1 | 82.28 |
| .15 | 3330.0 | 84.09 |
| .20 | 3325.9 | 85.87 |
| .25 | 3321.8 | 87.58 |
| .30 | 3317.7 | 89.00 |
| .35 | 3313.5 | 88.97 |
| .40 | 3309.4 | 87.51 |
| .45 | 3305.3 | 85.09 |
| .50 | 3301.2 | 82.33 |
| .55 | 3297.1 | 79.47 |
| .60 | 3293.0 | 76.55 |
| .65 | 3288.9 | 73.60 |
| .70 | 3284.8 | 70.62 |
| .75 | 3280.7 | 67.62 |
| 1.00 | 3260.1 | 52.33 |

CRX INDEX: 2862 2878
*In SBL photometric units

TABLE 13

Effect of halophosphate addition to a 3,000K blend containing
phosphors #246, SAE, #2288, and #2345. (See also FIG. 11).
MAIN BLEND: 0.000 (#246), 0.158 (SAE), 0.247 (#2288), 0.593 (#2345)
HALO BLEND: 0.031 (#4381); 0.028 (#4459); 0.941 (#4300)
(in SCL units)

| Halo Fraction* | Lumens | CRI |
| --- | --- | --- |
| .00 | 3334.0 | 77.60 |
| .05 | 3330.3 | 79.53 |
| .10 | 3326.6 | 81.46 |
| .15 | 3322.9 | 83.36 |
| .20 | 3319.2 | 85.24 |
| .25 | 3315.5 | 87.08 |
| .30 | 3311.9 | 88.78 |
| .35 | 3308.2 | 89.43 |
| .40 | 3304.5 | 88.14 |
| .45 | 3300.8 | 85.92 |
| .50 | 3297.1 | 83.10 |
| .55 | 3293.4 | 80.15 |
| .60 | 3289.7 | 77.14 |
| .65 | 3286.0 | 74.11 |
| .70 | 3282.3 | 71.05 |
| .75 | 3278.6 | 67.97 |
| 1.00 | 3260.1 | 52.33 |

CRX INDEX: 2879 2895
*In SBL photometric units

TABLE 14

Peak CRI in halo-admixed four-component blends containing phosphors #246, SAE, #2288, and #2345 (in order of increasing SAE content). Comparison with no halo addition.

Single-Component-Lamp Fractions of

| #246  | SAE   | #2293 | #2345 | Halo fract.* | Lumens | CRI  |
|-------|-------|-------|-------|--------------|--------|------|
| 0.069 | 0.000 | 0.349 | 0.581 | 0.00         | 3381.6 | 81.8 |
| 0.069 | 0.000 | 0.349 | 0.581 | 0.25         | 3351.2 | 87.1 |
| 0.056 | 0.029 | 0.330 | 0.583 | 0.00         | 3372.7 | 81.3 |
| 0.056 | 0.029 | 0.330 | 0.583 | 0.25         | 3344.6 | 87.7 |
| 0.053 | 0.037 | 0.325 | 0.584 | 0.00         | 3370.5 | 81.1 |
| 0.053 | 0.037 | 0.325 | 0.584 | 0.25         | 3342.9 | 87.8 |
| 0.042 | 0.060 | 0.310 | 0.586 | 0.00         | 3363.6 | 80.6 |
| 0.042 | 0.060 | 0.310 | 0.586 | 0.30         | 3332.6 | 88.3 |
| 0.038 | 0.071 | 0.303 | 0.587 | 0.00         | 3360.4 | 80.4 |
| 0.038 | 0.071 | 0.303 | 0.587 | 0.30         | 3330.3 | 88.5 |
| 0.033 | 0.082 | 0.297 | 0.588 | 0.00         | 3357.1 | 80.1 |
| 0.033 | 0.082 | 0.297 | 0.588 | 0.30         | 3328.0 | 88.7 |
| 0.029 | 0.092 | 0.290 | 0.588 | 0.00         | 3354.2 | 79.8 |
| 0.029 | 0.092 | 0.290 | 0.588 | 0.30         | 3325.9 | 88.8 |
| 0.024 | 0.102 | 0.283 | 0.589 | 0.00         | 3351.0 | 79.5 |
| 0.024 | 0.102 | 0.283 | 0.589 | 0.30         | 3323.7 | 88.9 |
| 0.014 | 0.124 | 0.269 | 0.591 | 0.00         | 3344.4 | 78.8 |
| 0.014 | 0.124 | 0.269 | 0.591 | 0.30         | 3319.1 | 89.0 |
| 0.011 | 0.131 | 0.265 | 0.591 | 0.00         | 3342.3 | 78.6 |
| 0.011 | 0.131 | 0.265 | 0.591 | 0.30         | 3317.7 | 89.0 |
| 0.000 | 0.158 | 0.247 | 0.593 | 0.00         | 3334.0 | 77.6 |
| 0.000 | 0.158 | 0.247 | 0.593 | 0.35         | 3308.0 | 89.4 |

*In SBL units

I claim:

1. A fluorescent lamp comprising a glass envelope having electrodes at its ends, a mercury and inert gas filling within said envelope which produces ultraviolet radiation, a coating on the interior surface of the glass envelope comprising a blend of alkaline earth metal halophosphate phosphors and a quad-phosphor blend for converting a substantial portion of said ultraviolet radiation to visible illumination having a white color wherein the combination of phosphors result in a predetermined color point from about 2700 to about 4200K on or near the Planckian locus, said quad-phosphor blend comprising a red color emitting phosphor component having a visible emission spectrum principally in the 590 to 630 nm wavelength range, blue color emitting phosphor component having an emission spectrum principally in the 430 to 490 nm wavelength range, and a green color emitting phosphor component having an emission spectrum principally in the 500 to 570 nm wavelength range, said quad-phosphor blend additionally includes an europium activated aluminate green emitting phosphor component wherein both the quad-blend and said blend of alkaline earth metal halophosphate phosphors substantially match the desired predetermined color point.

2. A fluorescent lamp according to claim 1 wherein said alkaline earth metal halophosphate phosphor and a quad-phosphor blend are formed as a mixture.

3. A fluorescent lamp according to claim 1 wherein said alkaline earth metal halophosphate phosphor is a separate layer on the interior surface of the glass envelope.

4. A fluorescent lamp according to claim 3 wherein said phosphor coating comprises a dual layer comprising a first layer deposited on the inner glass surface and a second layer of quad-phosphor blend deposited directly on said first phosphor layer.

5. A fluorescent lamp according to claim 4 wherein said first layer comprises a blend of alkaline earth metal halophosphate phosphor.

6. A fluorescent lamp according to claim 5 wherein second layer comprises a four component blend of phosphors of sufficient thickness for converting a substantial portion of the ultraviolet radiation to visible illumination having a white color.

7. A fluorescent lamp according to claim 6 wherein said first layer comprises a finely divided fluorescent calcium haloapatite phosphor exhibiting the desired white color point.

8. A fluorescent lamp according to claim 7 wherein said visible light has predetermined x and y values of ICI coordinates wherein the x value is in the range of 0.425 to 0.45, and said y value is in the range of 0.375 to 0.425.

9. A fluorescent lamp according to claim 8 wherein the amount of said quad-phosphor blend is from about 10 percent and 50 weight percent of the total combined phosphor weight of said first and said second phosphor layers.

10. A fluorescent lamp according to claim 3 wherein said green emitting phosphor is a zinc orthosilicate phosphor.

11. A fluorescent lamp according to claim 10 wherein said zinc orthosilicate phosphor has a continuous aluminum oxide coating surrounding individual phosphor particle.

12. A fluorescent lamp according to claim 3 wherein said blue color emitting phosphor is narrow band emitting phosphor.

13. A fluorescent lamp according to claim 12 wherein said blue emitting phosphors are selected from the group consisting of europium activated barium magnesium aluminate, europium activated strontium cholorophosphate, and europium activated strontium barium calcium chlorophosphate.

14. A fluorescent lamp according to claim 13 wherein said blue emitting phosphor has the formula $BaMg_2Al_{16}O_{27}:Eu^{+2}$.

15. A fluorescent lamp according to claim 14 wherein said first phosphor component is a red color emitting phosphor activated by trivalent europium.

16. A fluorescent lamp according to claim 15 wherein said red emitting phosphor is europium activated gadolinium oxide ($Gd_2O_3:Eu^{+3}$) or europium activated yttrium oxide ($Y_2O_3:Eu^{+3}$) or mixtures thereof.

17. A fluorescent lamp according to claim 16 with said yttrium oxide activated by trivalent europium having a peak emission at 611 nm.

18. A fluorescent lamp according to claim 17 wherein said europium activated aluminate green emitting phosphor component is activated by $Eu^{+2}$.

19. A fluorescent lamp according to claim 18 wherein said europium activated aluminate green emitting phosphor component is selected from the group consisting of $MAl_2O_4$, the beta-alumina $RAl_{11}O_{17}$, and the hexagonal aluminates $MAl_{12}O_{19}$ where M is one of three ions Ca, Sr, or Ba and R is Na, K, or Rb.

20. A fluorescent lamp according to claim 18 wherein said europium activated aluminate green emitting phosphor component comprises the hexagonal aluminates with magnetoplumbite structure.

* * * * *